Jan. 10, 1939.　　　K. J. DE JUHASZ　　　2,143,011
OPTICAL INDICATOR
Filed Oct. 7, 1936　　　2 Sheets-Sheet 1

Inventor
Kalman John De Juhasz

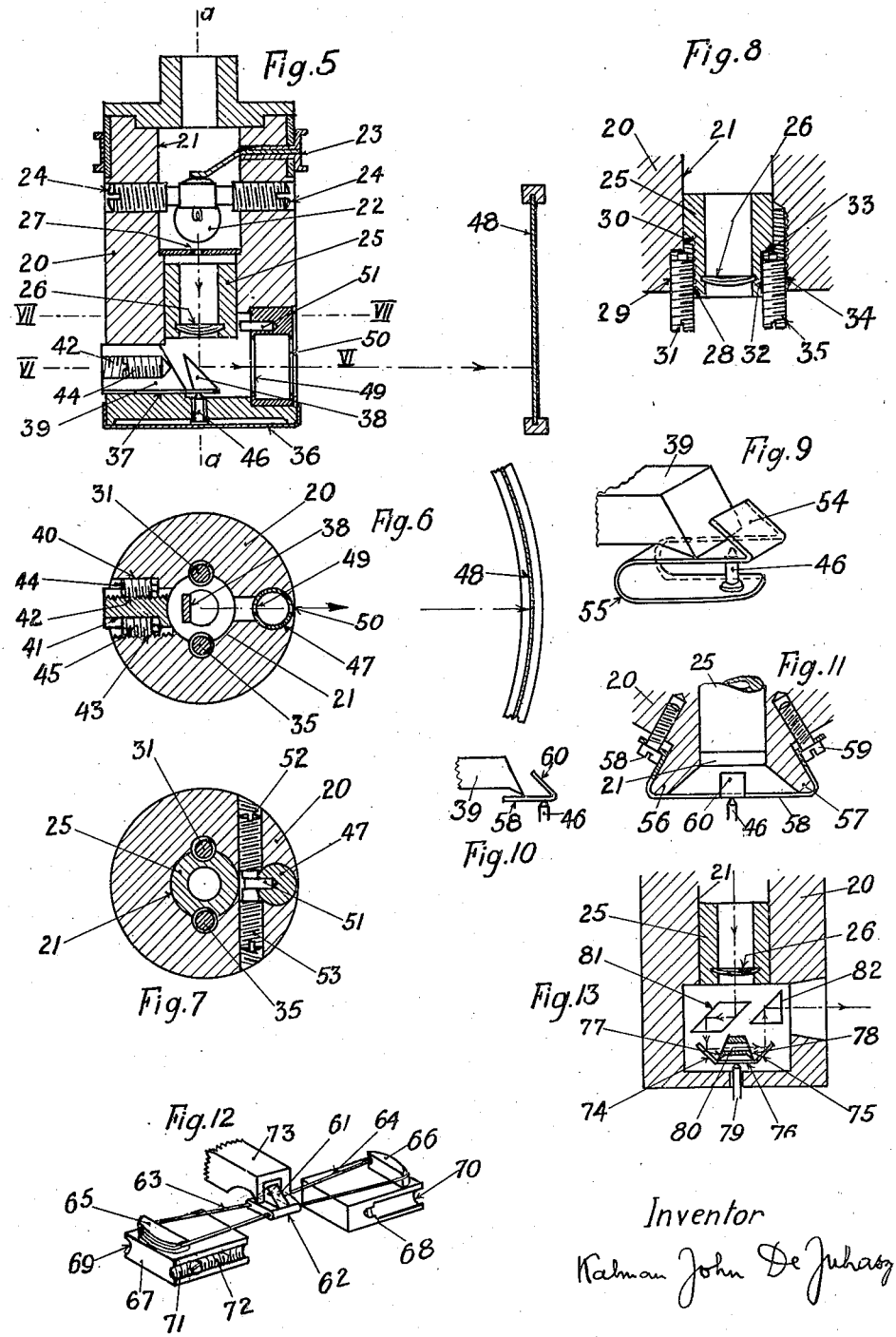

Patented Jan. 10, 1939

2,143,011

UNITED STATES PATENT OFFICE 2,143,011

OPTICAL INDICATOR

Kalman John De Juhasz, State College, Pa.

Application October 7, 1936, Serial No. 104,449

8 Claims. (Cl. 88—24)

This invention relates to indicators for magnifying small motions by optical means.

Indicators of the optical type have been made heretofore in which a beam of light has been made to impinge upon a mirror which is subject to two angular displacements about mutually perpendicular axes. One of these displacements is intended to be proportional to an independent variable such as the crank angle or piston stroke of an engine, while the other angular displacement is intended to be proportional to a dependent variable, such as pressure, valve position or the like. The dependent variable or motion to be studied, is thus indicated as a function of the independent variable. The beam from the mirror is then received on a screen or directed onto a sensitive film or paper to obtain the indicator diagram. The difficulty with the devices of the prior art lies in the fact that the scale of the resultant indicator diagram varies and, before the true conditions can be ascertained, the diagram must be replotted on a uniform scale.

One of the objects of the present invention is to provide a small, compact and self-contained optical indicator which is simple in construction yet efficient and accurate in operation. Another object is to provide an optical indicator in which the light beam moves so as to make the diagram on a uniform scale and thus approach an accurate proportionality of the records of the two variables. A further object is to provide an optical indicator in which the magnification is variable at will. A still further object is to provide an optical indicator in which the parts may be readily adjusted as to focus and magnification. These and other objects and advantages reside in certain novel features of construction, arrangement and combination of parts as will hereinafter be more fully set forth and pointed out in the appended claims.

Referring to the drawings:

Fig. 5 is a longitudinal sectional view showing one embodiment of my invention.

Fig. 6 is a section taken on line VI—VI of Fig. 5.

Fig. 7 is a section taken on line VII—VII of Fig. 5.

Fig. 8 is a fragmentary longitudinal section taken perpendicularly to that of Fig. 5 and showing the lens focusing mechanism.

Figs. 9, 10, 11, 12 and 13 are detail views of modifications showing different types of reflector mounts.

Figure 1:
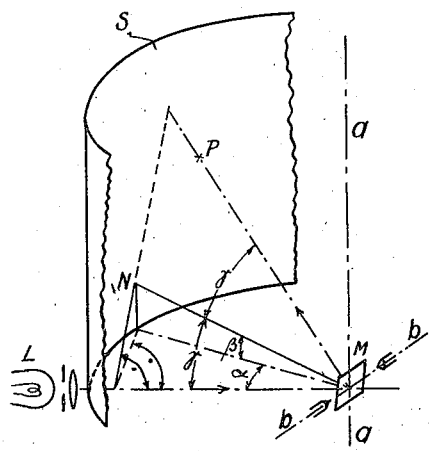
Fig. 1 is a diagrammatic view showing the arrangement of parts in the prior art.
Figure 2:
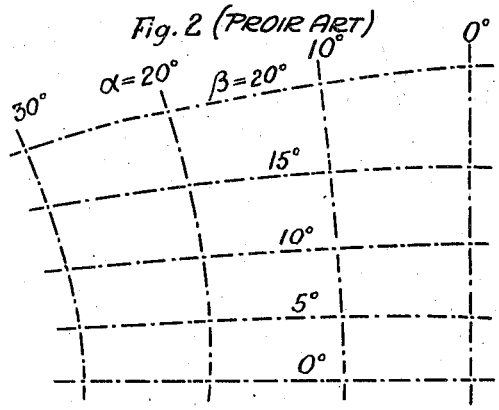
Fig. 2 is a view of the diagram field of such an indicator showing the variable scale.

In the prior art devices, as illustrated in Fig. 1, the direction of the light beam from the light source L is at approximately a right angle to the two perpendicular rotational axes $a$—$a$ and $b$—$b$ of the mirror M when the mirror is in its median position. Whenever the mirror M is displaced from this median position, the orientation of the stationary beam with reference to the mirror will be altered. In Fig. 1, displacement about the axis $a$—$a$ is made proportional to the independent variable and displacement about the axis $b$—$b$, to the dependent variable. The angles $\alpha$ and $\beta$ thus indicate values of the independent and dependent variables, respectively. The point N is the intersection of the perpendicular from the mirror M with the screen S and the beam reflected from the mirror will intersect the screen S at a point P lying in the plane LMN. The angle $\gamma$ is the angle of incidence. For every pair of values of $\alpha$ and $\beta$ a corresponding point P can be determined by geometrical construction. The field of diagram of this device is given in Fig. 2 for a set of values on the developed cylinder. It is seen that the recorded lines corresponding to a constant value of the independent variable are curved, instead of straight as they are intended to be. The lines corresponding to constant values of the dependent variable are also curved, instead of being straight. Thus it follows that the scale of the diagram varies, in each point of the diagram for both the independent and dependent variables.

In order to mitigate the error resulting from this source in the optical indicators of the prior art, it was necessary to restrict the angular displacement of the mirror about both axes to only a few degrees. This in turn made it necessary to place the screen at a considerable distance from the mirror in order to obtain a sufficiently large magnification and the instrument resulting from this arrangement was thus of large and cumbersome dimensions.

Figure 3:
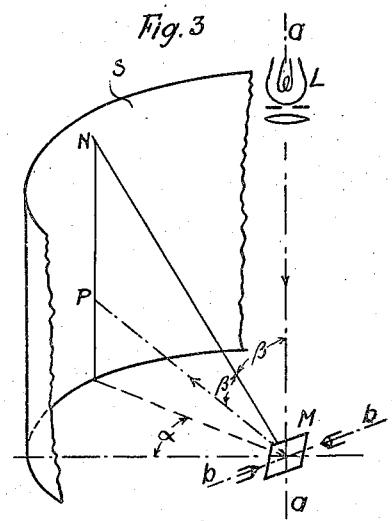
Fig. 3 is a diagrammatic view showing the arrangement of parts according to this invention.
Figure 4:
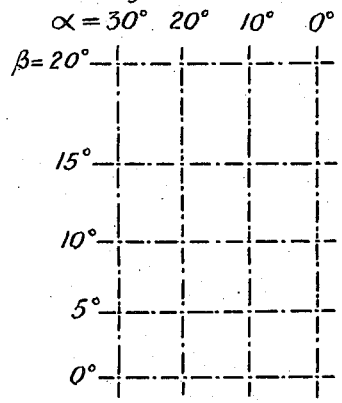
Fig. 4 is a view of the diagram field of the present indicator showing the uniform scale.

In the present invention the aforementioned error source is obviated by directing the incident beam parallel to, or coincident with, the rotational axis for one of the variables, preferably that for the independent variable. This arrangement is shown in Fig. 3 in which the source of light L is located on the $a$—$a$ axis. The incident beam meets the obliquely placed mirror M the perpendicular from which intersects the screen in point N. The reflected beam will lie in the plane LMN which is a meridional plane around the rotational axis $a$—$a$, and the light spot P on the screen can be found by doubling the angle of incidence $\beta$ in this meridional plane. From this arrangement it follows that the geometry of the light beam will be the same for all values of the independent variable $\alpha$. For this reason a large angular displacement or even a complete rotation of the mirror system can be utilized for the independent variable, resulting in a corresponding decrease in the necessary dimensions of the instrument. In virtue of this geometrical arrangement both the lines of constant independent variable and those of the dependent variable, will be straight lines perpendicular to one another, forming an orthogonal system of coordinates which obviates the necessity of re-drawing the record obtained. The field of diagram is shown in Fig. 4 for a number of $\alpha$ and $\beta$ values.

The above-described basic idea is incorporated in some designs shown in Figs. 5-13. It is, however, to be understood that the various instrumentalities of which my invention consists may be otherwise arranged and organized and that my invention is not limited to the precise forms as they are shown and described here.

One form of optical indicator embodying this invention is illustrated in Figs. 5, 6, 7 and 8 wherein 20 designates a barrel which is rotatable about the longitudinal axis $a$—$a$. The barrel 20 is provided with a central axial opening 21 within which is mounted a lamp bulb 22 of the type known commercially as a flashlight bulb. Current is supplied to the bulb 22 by means of an insulated ring 23 and a brush, not shown, in a manner well known to those skilled in the art. Four screws 24 extend radially through the barrel 20 into the opening 21 to hold the lamp bulb 22 and these screws 24 may be adjusted in order to align the filament of the bulb 22 with the axis of rotation $a$—$a$. A diaphragm plate 27 restricts the utilized light rays to those in the neighborhood of the axis.

A lens cell 25 is slidably mounted in the opening 21 beneath the lamp bulb 22 and carries a condensing lens or lens-system 26. As shown in Fig. 8, a focusing mechanism is provided for adjusting the cell 25 longitudinally in the opening 21 and for locking the cell in adjusted position. The lens cell 25 is provided on one side with a threaded half-hole 28 and the wall of the barrel 20 is provided with a smooth half-hole 29 of the same diameter and terminating with a shoulder 30. A screw 31 extending into the two half-holes in engagement with the threads in the half-hole 28, bears against the shoulder 30 and, when rotated, tends to move the lens cell 25 out of the opening 21. On the other side of the lens cell 25 is a smooth half-hole 32 terminating with a shoulder 33 and a threaded half-hole 34 of the same diameter, is formed in the wall of the barrel 20. A screw 35 extending into the two half-holes 32 and 34 in engagement with the threads in the half-hole 34 bears against the shoulder 33 so that rotation of the screw 35 tends to move the cell 25 into the opening 21.

Secured at the bottom of the barrel 20 is a flexible diaphragm 36 upon which is mounted a connecting pin 46. The leaf spring 37 carries at its end a mirror 38 which is inclined at an angle of approximately 45 degrees to the optical axis. The upper side of the leaf-spring 37 bears against the fulcrum 39 which is transversely adjustable for a purpose to be hereinafter described. The fulcrum 39 is preferably provided with the same type of adjusting mechanism as the lens cell 25, and has similar smooth half-holes 40 and 41, threaded half-holes 42 and 43 and screws 44 and 45. The connecting pin 46 mounted on the diaphragm 36 bears against the bottom of the mirror 38 so that any movement of the diaphragm 36 is transmitted to the mirror 38 and tends to move it about the fulcrum 39.

After being reflected from the mirror 38, the light beam passes through a shutter 47 onto a screen or sensitive surface 48. The size of the luminous spot can be controlled by the shutter 47 which is a cylinder provided with two diametrically opposed slots 49 and 50. The shutter 47 is rotatably mounted in the barrel 20 and has at its upper end a projecting pin 51. Two opposed screws 52 and 53 threaded in the barrel 20 engage the pin 51 and serve both to adjust the shutter 47 and to lock it in adjusted position.

In operation, the lamp bulb 22 is adjusted by means of the screws 24 until its filament is positioned on the axis of rotation $a$—$a$, the lens cell 25 is moved until a spot of maximum intensity is formed, and the shutter 47 is adjusted until the light spot on the screen or surface 48 attains the desired size. If, for example, the vibration of an engine is to be studied and that vibration is a function of the crank shaft angle, the barrel 20 has to be rotated at crankshaft speed and the vibration to be studied is imparted to the diaphragm 36 and transmitted to the mirror 38 by the connecting pin 46. The path of the spot of light gives the vibration as a function of the crankshaft angle and this path may be traced on a translucent surface or photographed on a sensitive sheet. The amplitude of the oscillations of the mirror 38 is directly proportional to the amplitude of the rectilinear movement imparted to the diaphragm 36 and inversely proportional to the length of the mirror arm, that is, the distance between the fulcrum 39 and the pin 46 and therefore the magnification ratio can be varied by moving the fulcrum 39.

Fig. 9 shows a modification in which the mirror 54 is formed as an integral part of the leaf spring 55 to which a greater flexibility is provided by giving it a U shape. The structure and its function is otherwise similar to that shown in Figs. 5 to 8.

In the embodiment shown in Figs. 10 and 11, the interior of the barrel 20 is formed with two downwardly extending projections 56 and 57, one on each side of the opening 21. A strip 58 of flexible metal is tensioned over the projections 56 and 57 by two tension screws 58 and 59 and the mirror 60 is either formed integrally with the strip 58 or rigidly secured thereto. This modification presents the advantage of having a spring whose tension and hence natural frequency of vibration, can be altered and adjusted to suit the particular motion to be studied.

Fig. 12 illustrates a bifilar mirror suspension in place of the flat spring of the preceding embodiments. In this modification, the mirror 61 is mounted upon a plate 62 which is supported by two wire loops 63 and 64 stretched between the tension blocks 65 and 66. The tension blocks 65 and 66 are mounted upon two adjustable slides 67 and 68, respectively, so that the tension of the wire loops 63 and 64 may be adjusted at will. The adjusting mechanism for the slides 67 and 68 can be similar to that of the lens cell as shown in Fig. 8 and is indicated by the smooth half-holes 69 and 70, the threaded half-hole 71 and the screw 72. The knife-edge fulcrum 73 is preferably bifurcated and engages the plate 62 on opposite sides of the mirror 61, providing a safeguard against lateral displacement of the mirror.

In the modification shown in Fig. 13, two mirrors 74 and 75 are rigidly secured on or formed integrally with a single leaf spring 76. The fulcrum member has two legs 77 and 78 which engage the spring 76 on opposite sides of the connecting pin 79 and an aperture 80 in the fulcrum member permits the passage of light from the mirror 74 to the mirror 75. A prism 81 receives the light from the light source through the condenser lens 26 and directs it to the mirror 74 while a second prism 82 receives the light from the mirror 75 and directs it to the screen or sensitive surface. When the pin 79 is moved, both mirrors 74 and 75 are deflected by the same amount and the sum of these two deflections is manifested by the displacement of the light spot on the screen. This modification presents the advantages of being more sensitive due to the double deflection of the light spot and also of being free of any error due to centrifugal force, as the mirror assembly can be made perfectly symmetrical and balanced.

The proper elastic suspension of the mirror is essential to the accurate functioning of the indicator. The suspension must be stiff enough to give a high natural frequency of vibration to the mirror, yet yielding enough to permit a sufficient amount of angular displacement. Furthermore, the suspension must hold the mirror rigidly against any sidewise or other unintended displacement. The above described modifications possess these advantages but, of course, other satisfactory suspensions could be devised by those skilled in the art.

From the foregoing it will be apparent that I am able to attain the objects of my invention and provide an optical indicator which is simple in construction yet accurate and efficient in operation. While I have described the mechanism embodying this invention as a self-contained unit, obviously the light source and condensing system could be independently and rigidly mounted and the mirror system alone rotated. This latter system would permit the use of larger and more powerful light sources and the size of the rotating barrel could be materially reduced. The apparatus disclosed shows only the preferred form. Various other modifications can also be made without departing from the spirit of my invention or the scope of the appended claims.

I claim:

1. An optical indicator for indicating the relation of two variables comprising a body supported rotatably about a fixed axis of rotation, means for rotating said body about said fixed axis by an angle responsive to one of said two variables, means for producing a light beam and directing it along said axis of rotation, a mirror supported in said body and partaking in the rotation of said body intercepting said light beam and deflecting it in a meridional plane of said body, mirror-supporting means mounted in said body and partaking in its rotation allowing said mirror to be tilted about a tilt-axis perpendicular to said meridional plane, means for tilting said mirror about said tilt-axis by an angle responsive to the other of said two variables, a screen intercepting said deflected light beam whereon a line representing the motion of said mirror tilting means as a function of said body rotating means is traced.

2. An optical indicator for indicating the relation of two variables comprising a body supported rotatably about a fixed axis of rotation, means for rotating said body about said fixed axis by an angle responsive to one of said two variables, a light source mounted in said body and partaking in the rotation of said body, means for producing a light beam and directing it along said axis of rotation, a mirror supported in said body and partaking in the rotation of said body intercepting said light beam and deflecting it in a meridional plane of said body, mirror-supporting means mounted in said body and partaking in its rotation allowing said mirror to be tilted about a tilt-axis perpendicular to said meridional plane, means for tilting said mirror about said tilt-axis by an angle responsive to the other of said two variables, a screen intercepting said deflected light beam whereon a line representing the motion of said mirror-tilting means as a function of said body rotating means is traced.

3. An optical indicator for indicating the relation of two variables comprising a body supported rotatably about a fixed axis of rotation, means for rotating said body about said fixed axis by an angle responsive to one of said two variables, means for producing a light beam and directing it along said axis of rotation, a mirror supported in said body and partaking in the rotation of said body intercepting said light beam and deflecting it in a meridional plane of said body, mirror-supporting means mounted in said body and partaking in the rotation of said body allowing said mirror to be tilted about a tilt-axis perpendicular to said meridional plane, means for adjusting the distance of said tilt-axis from said axis of rotation of said body, means for tilting said mirror about said tilt-axis by an angle responsive to the other of said two variables, a screen intercepting said deflected light beam whereon a line representing the motion of said mirror-tilting means as a function of said body-rotating means is traced.

4. An optical indicator for indicating the relation of two variables comprising a body supported rotatably about a fixed axis of rotation, means for rotating said body about said fixed axis by an angle responsive to one of said two variables, means for producing a light beam and directing it along said axis of rotation, a mirror supported in said body and partaking in the rotation of said body intercepting said light beam and deflecting it in a meridional plane of said body, mirror-supporting means mounted in said body and partaking in its rotation allowing said mirror to be tilted about a tilt-axis perpendicular to said meridional plane, means for tilting said mirror about said tilt-axis by an angle responsive to the other of said two variables, a screen intercepting the said deflected light beam whereon a line representing the motion of said mirror-tilting means as a function of said body rotating means is traced, optical means for bringing said light beam to a focus on said screen.

5. An optical indicator for indicating the relation of two variables comprising a body supported rotatably about a fixed axis of rotation, means for rotating said body about said fixed axis by an angle responsive to one of said two variables, means for producing a light beam and directing it along said axis of rotation, a mirror supported in said body and partaking in the rotation of said body intercepting said light beam and deflecting it in a meridional plane of said body, mirror-supporting means mounted in said body and partaking in its rotation allowing said mirror to be tilted about a tilt-axis perpendicular to said meridional plane, means for tilting said mirror about said tilt-axis by an angle responsive to the other of said two variables, a screen intercepting said deflected light beam whereon a line representing the motion of said mirror-tilting means as a function of said body-rotating means is traced, optical means for bringing said light beam to a focus on said screen, said optical means comprising a lens cell slideably mounted in an axial bore of said body in the path of said light beam, means for axially displacing said lens cell in said axial bore, said displacing means comprising a threaded half-hole in one side of said lens cell and a not threaded half hole of the same diameter in the adjacent wall of said axial bore, said not threaded half hole being formed with a bottom, a screw filling said half holes and engaging said threads and said bottom for the purpose of moving the lens cell in one direction with reference to said axial bore, a not threaded half hole formed in the other side of said lens cell, said not threaded half hole being formed with a bottom, a threaded half hole of the same diameter as the not threaded half hole formed in the adjacent wall of said axial bore and a second screw filling the last named half holes and engaging said threads and said bottom for the purpose of moving said lens cell in the other direction with reference to said axial bore and thus by tightening both said screws to lock the said lens cell in the desired location with reference to said axial bore.

6. An optical indicator for indicating the relation of two variables comprising a body supported rotatably about a fixed axis of rotation, means for rotating said body about said fixed axis by an angle responsive to one of said two variables, means for producing a light beam and directing it along said axis of rotation, a mirror supported in said body and partaking in the rotation of said body intercepting said light beam and deflecting it in a meridional plane of said body, mirror-supporting means mounted in said body and partaking in its rotation allowing said mirror to be tilted about a tilt-axis perpendicular to said meridional plane, said mirror-supporting means consisting of a leaf spring positioned radially in said body and fastened at its outer end to said body and carrying at its central end the mirror, a fulcrum edge located in said body perpendicular to said meridional plane and bearing against said leaf spring, means for tilting said mirror about said tilt-axis against the bending moment of said leaf spring by an angle responsive to the other of said two variables, a screen intercepting said deflected light beam whereon a line representing the motion of said mirror-tilting means as a function of said body-rotating means is traced.

7. An optical indicator for indicating the relation of two variables comprising a body supported rotatably about a fixed axis of rotation, means for rotating said body about said fixed axis by an angle responsive to one of said variables, means for producing a light beam and directing it along said axis of rotation, a mirror supported in said body and partaking in the rotation of said body intercepting said light beam and deflecting it in a meridional plane of said body, mirror-supporting means mounted in said body and partaking in its rotation allowing said mirror to be tilted about a tilt-axis perpendicular to said meridional plane, said mirror-supporting means consisting of a resilient strip stretched diametrally in said body and perpendicularly to said axis of rotation carrying at its middle the said mirror, a fulcrum located in said body perpendicularly to said meridional plane and bearing against said resilient strip, means for tilting said mirror about said tilt-axis against the torsional moment of said resilient strip by an angle responsive to the other of said two variables, a screen intercepting said deflected light beam whereon a line representing the motion of said mirror-tilting means as a function of said body-rotating means is traced.

8. An optical indicator for indicationg the relation of two variables comprising a body supported rotatably about a fixed axis of rotation, means for rotating said body about said fixed axis by an angle responsive to one of said two variables, means for producing a light beam and directing it along said axis of rotation, an axial opening in said body forming a passageway for said light beam, a transverse opening in said body intersecting said axial opening, two parallel fulcrum edges located in said body perpendicularly to said axis of rotation and on opposite sides of said axis of rotation, a resilient strip extending across said fulcrum edges, two mirrors carried by said resilient strip one on each end of said strip having their principal optical axes perpendicular to said fulcrum edges and capable of being tilted about said fulcrum edges, optical means for directing said light beam on one of said two mirrors and in succession to the other of said two mirrors and then through said transverse opening in a plane parallel with said axis of rotation, means for tilting said two mirrors about said fulcrum edges against the bending moment of said resilient strip by an angle responsive to the other of said two variables, a screen intercepting said deflected light beam whereon a line representing the motion of said mirror-tilting means as a function of said body-rotating means is traced.

KALMAN JOHN DE JUHASZ.